United States Patent [19]
Kitani et al.

[11] 3,832,523
[45] Aug. 27, 1974

[54] METHOD FOR ELECTRICAL ARC WELDING

[75] Inventors: Toshio Kitani, Kobe; Hisao Goto, Takatsuki, both of Japan

[73] Assignee: Osaka Transformer Co., Ltd., Osaka-fu, Japan

[22] Filed: Apr. 17, 1972

[21] Appl. No.: 244,720

[52] U.S. Cl. ............................................. 219/137
[51] Int. Cl. ............................................. B23k 9/00
[58] Field of Search ......... 219/73, 74, 76, 130, 136, 219/137, 145

[56] References Cited
UNITED STATES PATENTS

| | | | |
|---|---|---|---|
| 1,979,264 | 11/1934 | Hodge et al. | 219/137 |
| 2,395,723 | 2/1946 | Chmidewski | 219/73 |
| 2,490,023 | 12/1944 | Bernard | 219/146 |
| 2,490,024 | 12/1944 | Bernard | 219/137 |
| 2,654,015 | 9/1953 | Landis et al. | 219/73 |
| 2,848,593 | 8/1953 | Newman et al. | 219/73 |
| 2,916,600 | 12/1959 | Tichler | 219/74 |
| 2,951,931 | 9/1960 | Danhler | 219/73 |
| 3,123,702 | 3/1964 | Keidel et al. | 219/74 |
| 3,192,079 | 6/1965 | Takagi et al. | 219/73 |

FOREIGN PATENTS OR APPLICATIONS

| | | | |
|---|---|---|---|
| 895,412 | 5/1962 | Great Britain | 214/74 |
| 2,000,037 | 1/1971 | Germany | 219/74 |

OTHER PUBLICATIONS

"Welded Joints", Welding Handbook, 1942, pp. 1,063–1,078.

*Primary Examiner*—J. V. Truhe
*Assistant Examiner*—Clifford C. Shaw
*Attorney, Agent, or Firm*—Craig & Antonelli

[57] ABSTRACT

A method of electrical arc welding which may be effected in various welding positions by the use of at least one electrode of substantially rectangular cross section, the electrode tip of which is square-edged or shaped to fit with the shape of a groove formed between workpieces to be welded, the electrode being disposed in such a way as to render the widthwise direction thereof oriented substantially at right angles to the weld line along which a weld is to be formed. Also disclosed is an apparatus for electrical arc welding which is capable of performing the concurrently proposed arc welding method.

23 Claims, 42 Drawing Figures

PATENTED AUG 27 1974

3,832,523

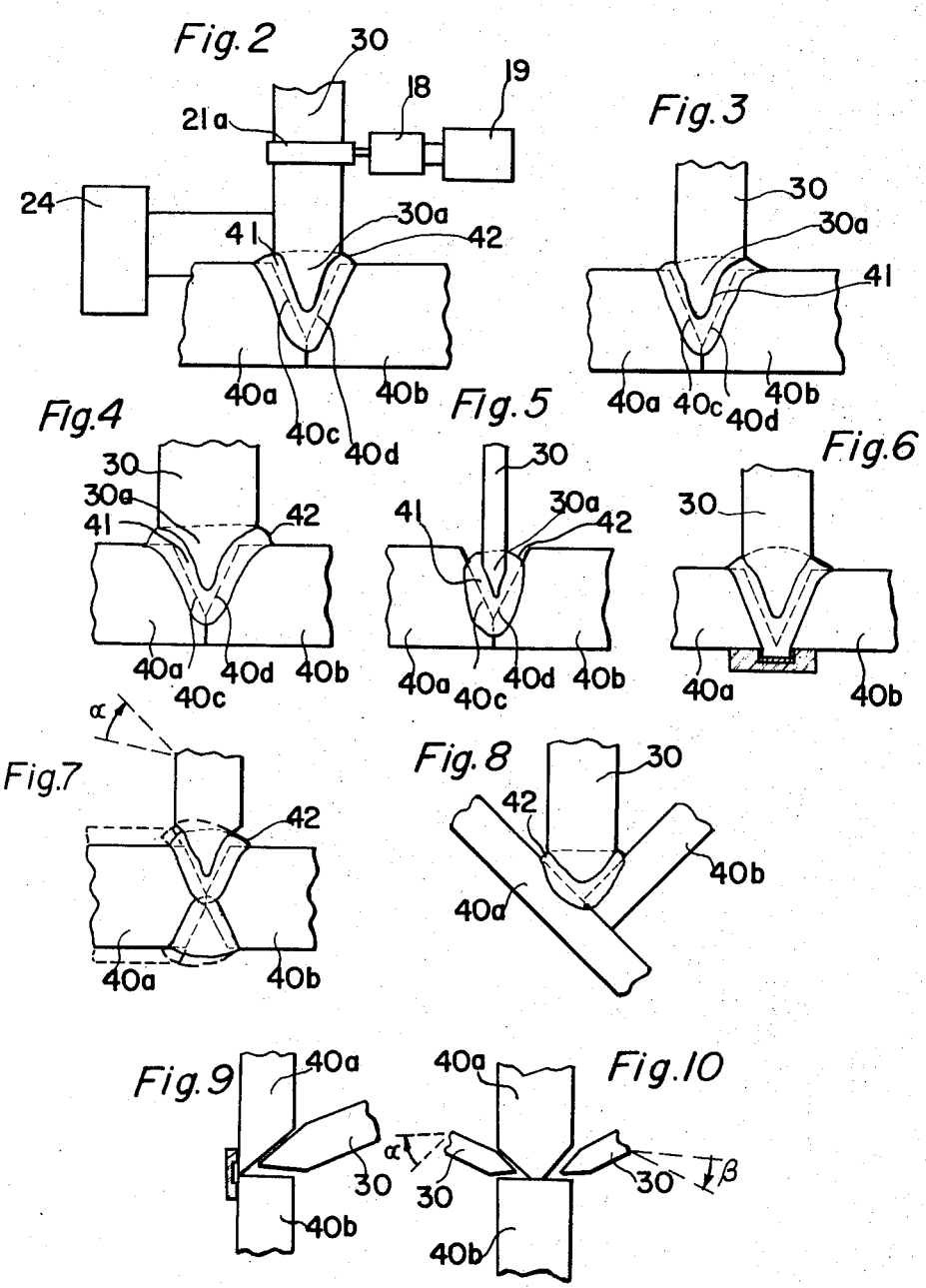

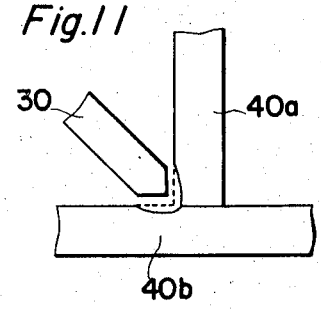
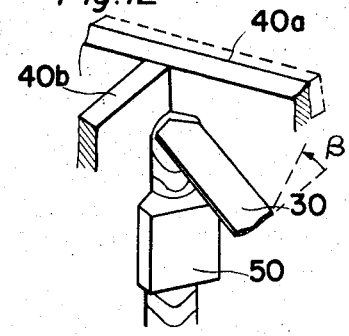
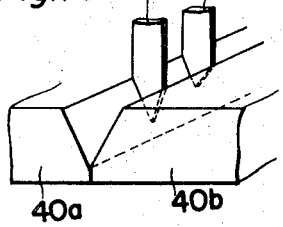
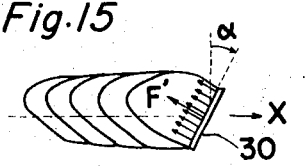
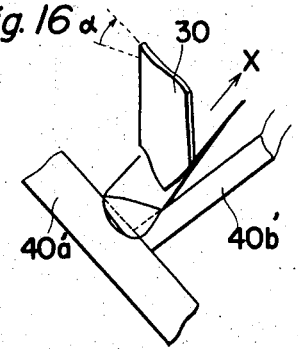
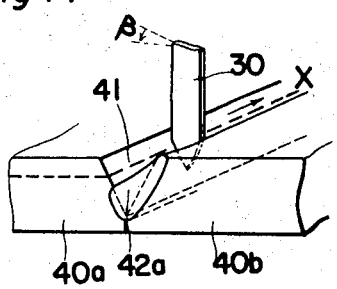

(A)

(B)

(C)

(D)

Fig.26 (E)
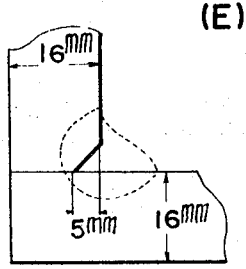
Fig.26 (G)
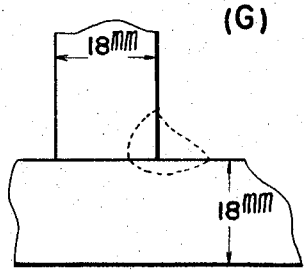
(F) Fig.26
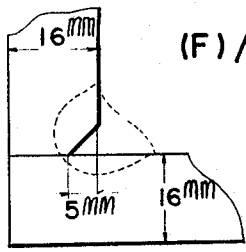
(H) Fig.26
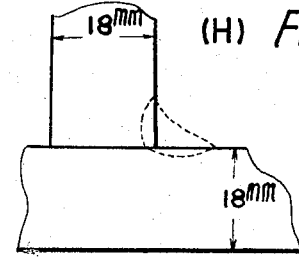
Fig.26 (I)
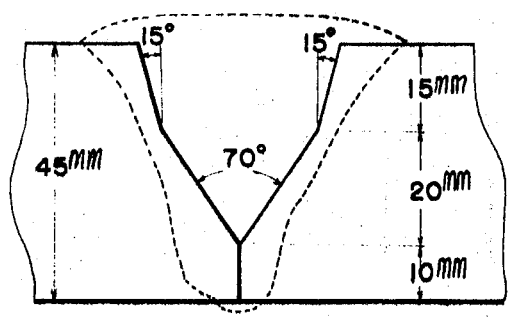

4 layers of Bead formed by manual welding (M)

(N)

(O)

(P)

METHOD FOR ELECTRICAL ARC WELDING

BACKGROUND OF THE INVENTION

The present invention relates to a method of and an apparatus for electrical arc welding. More specifically, the present invention relates to a method of electrical arc welding which can be efficiently performed in various welding positions by the use of at least one electrode of band-like shape arranged in such a manner that the widthwise direction of said electrode is oriented substantially at right angles to the weld line along which a weld is to be formed between a pair of workpieces to be welded, so that an efficiently welded joint can be obtained with substantial elimination of weld defects, and an electrical arc welding apparatus for practicing the same.

It is well recognized by those skilled in the art, during an arc welding process, welding must be performed without any critical weld defects in the resultant weld and the resultant weld must have a series of uniformly consecutive beads each having a proper width and a proper reinforcement with sufficient penetration.

For this reason, according to a conventional electrical arc welding method in which at least one electrode of substantially circular cross section, i.e., either of wire type or of rod type, is utilized, a strictly precise edge penetration is, in general, required with respect to a pair of workpieces to be welded. However, in view of the fact that, in addition to the joint design, various welding conditions such as welding current, arc voltage, welding speed, diameter of the electrode used and others greatly affect the welding result, great care must be taken in selecting each item of the welding conditions with respect to a given welder, a given welding method and/or a given joint design and, above all selected welding conditions must be maintained during the entire period of welding.

Particularly, where welding is subjected to a grooved joint or fillet joint between the workpieces to be welded, the weld has a tendency to be adversely affected by such welding conditions as hereinbefore described. For example, if the joint design of the workpieces is such that the groove angle is small while the groove depth is large, it has been oftentimes observed that sufficient penetration of the weld deposit cannot be expected, especially at the depth of the groove, and if a welding method is carried out by the use of an electrode of small diameter under high current density, to eliminate the above mentioned insufficient penetration, the depth of penetration will become large at the depth of the groove while undercut is formed along both or either of the sides of a resultant weld in the welding direction, so that the resultant weld is susceptible to cracking due to shrinkage stress and/or stress concentration on the toe of the weld.

On the other hand, where welding is employed for a joint design such that the groove width is large, the amount of the molten metal deposit necessary to fill the groove increases, requiring an increased amount of consumable material and/or requiring an increased number of welding passes with an eventually increased cost.

Furthermore, it is well known that improper positioning of the electrode, such as lateral displacement of the electrode with respect to the weld line, and displacement of the orientation of arc with respect to the root of the groove of workpieces to be welded, will cause one or more weld defects, such as displaced bead configuration and undercuts.

As hereinbefore described, in conventional arc welding wherein edge preparation must be applied to the workpieces to be welded prior to welding, such as a butt welding process and a fillet welding process, accurate selection and maintenance of edge dimensions and/or groove accuracy, as well as other welding conditions are individually required and, therefore, a smooth welding operation is somewhat hampered.

SUMMARY OF THE INVENTION

In view of the foregoing, the present invention has, accordingly, for its essential object the provision of an electrical arc welding method which can be practiced for various welding positions subject to the workpieces to be welded having a groove joint or a fillet joint, without requiring the above mentioned accurate selection and maintenance of the particulars of welding, ensuring formation of a favorable weld over the substantial length of weld line of the workpieces to be welded.

Another object of the present invention is to provide an electrical arc welding method of the above character wherein at least one electrode of substantially rectangular cross section, the width of said electrode being more than 5 times the thickness of the same electrode, is utilized during welding with the application of a welding current density of not less than 50 amperes per square millimeter.

A further object of the present invention is to provide an electrical arc welding method of the above character wherein, during welding an electrode of substantially rectangular cross section is fed, so that the widthwise direction of the electrode is oriented substantially at right angles to the weld line along which a weld is to be formed.

A still further object of the present invention is to provide an electrical arc welding method of the above character wherein welding is efficiently performed in various welding positions by adjusting the acute angle between the widthwise direction of the electrode to the weld line within the range of from 45° to 90°, so that the pattern of penetration of welding deposits and the configuration of a resultant bead can be varied.

A still further object of the present invention is to provide an electrical arc welding apparatus for practicing the above mentioned method.

A still further object of the present invention is to provide an electrical arc welding apparatus of the above type wherein there is provided an electrode guide designed for guiding a length of the electrode supplied from an electrode supply reel through an electrode feeding mechanism, so that the widthwise direction of the electrode is oriented substantially at right angles to the weld line.

According to the present invention, there is provided an electrical arc welding method wherein the electrode of substantially rectangular cross section, the width of said electrode being more than 5 times the thickness of the same electrode, is supplied to a joint of the workpiece to be welded in such a way as to cause the widthwise direction of the electrode to be oriented substantially at right angles to the weld line, whereby welding can be advantageously performed without requiring the precise edge preparation, as well as strict maintenance of the particular welding conditions, as have been required in the conventional electrical arc welding. In addition, thereto by the use of electrode of substantially rectangular cross section, various weld defects, resulting from an excessive penetration of welding deposit, insufficient penetration and improper positioning of the electrode, as hereinbefore described, can be advantageously eliminated.

Furthermore, according to the present invention, the method herein proposed may be practiced in such a way that the electrode is twisted a certain angle about the longitudinal axis thereof. In this case, welding can be performed without requiring the edge preparation and maintenance of the given welding conditions as accurate and strict as required in welding by the use of an electrode of circular cross section.

Attention is called to the fact that the electrode tip may be either square-edged or shaped to enable the tip to be inserted in a groove formed between the workpieces to be welded. However, even though the arc welding method of the invention can be practiced satisfactorily with respect to the square-edged electrode tip, a shaped electrode tip is recommended in view of the fact that a uniformly penetrated weld deposit can be obtained from the beginning of welding.

These and other objects and features of the present invention will become apparent to those skilled in the art from the following description taken in conjunction with preferred embodiments thereof shown in the accompanying drawings, in which:

FIG. 1 is a schematic perspective view of one exemplary type of welding apparatus according to the present invention, FIG. 2 is a schematic front elevational view showing the method of the present invention being performed subject to a single-V groove joint in flat welding position, FIGS. 3 to 5 are similar views to FIG. 2, which are used to illustrate improper positionings and selection of the electrode, FIG. 6 is a schematic front elevational view showing the method of the present invention being performed subject to a single V-groove joint with the use of a backing plate in flat welding position, FIG. 7 is a schematic front elevational view showing the method of the present invention being performed subject to a double-V groove joint in flat welding position, FIG. 8 is a schematic front elevational view showing the method of the present invention being performed in positioned fillet welding, FIG. 9 is a schematic front elevational view showing the method of the present invention being performed subject to a joint formed between upper and lower workpieces to be welded, the joint edge of the upper workpiece being inclined and welding being effected in horizontal welding position in a single pass, FIG. 10 is a schematic front elevational view showing the method of the present invention being performed subject to a K-shaped joint in horizontal welding position, FIG. 11 is a schematic front elevational view showing the method of the present invention being performed in non-positioned fillet welding, FIG. 12 is a schematic perspective view showing the method of the present invention being performed in fillet welding in vertical welding position, FIG. 13 is a schematic perspective view showing the method of the present invention being performed subject to a single-V groove joint in flat welding position by the use of a plurality of electrodes, FIG. 14 is a schematic diagram showing the outer appearance of a bead formed during arc welding by the use of an electrode of circular cross section, FIG. 15 is a schematic diagram showing the outer appearance of a bead formed by the method of the present invention wherein the electrode is twisted through a certain angle about its own longitudinal axis, FIG. 16 is a schematic perspective view showing the method of the present invention being performed in positioned fillet welding subject to a T-shaped joint of the workpieces of different thickness, FIG. 17 is a schematic perspective view showing the method of the present invention, with the electrode being twisted, performed subject to a single-V groove joint, the condition shown being during the first pass, FIG. 18 is a similar view to FIG. 17, but with the condition being shown as during the second pass, FIG. 19 and FIG. 20 are schematic perspective view showing the method of the present invention being performed in non-positioned fillet welding while the electrode is twisted, FIG. 21 and FIG. 22 are schematic perspective views showing the method of the present invention being performed in double pass subject to a joint formed between upper and lower workpieces to be welded, the joint edge of the upper workpiece being inclined and welding being effected in horizontal welding position, FIG. 23 and FIG. 24 are schematic diagrams showing the method of the present invention being performed in multi-pass welding subject to a single-U groove joint, FIG. 25 is a schematic perspective view showing the method of the present invention being practiced by the use of an electrode of circular cross section of any known conventional type and two electrodes of rectangular cross section subject to a single-V groove joint, FIGS. 26(A) to FIG. 26(P) are schematic diagrams showing joint preparations and bead formations employed for illustrating various examples of the method of the present invention, and FIG. 27 is a schematic perspective view of multielectrode welding in accordance with the method of the present invention.

DETAILED DESCRIPTION OF THE INVENTION

Figure 1:
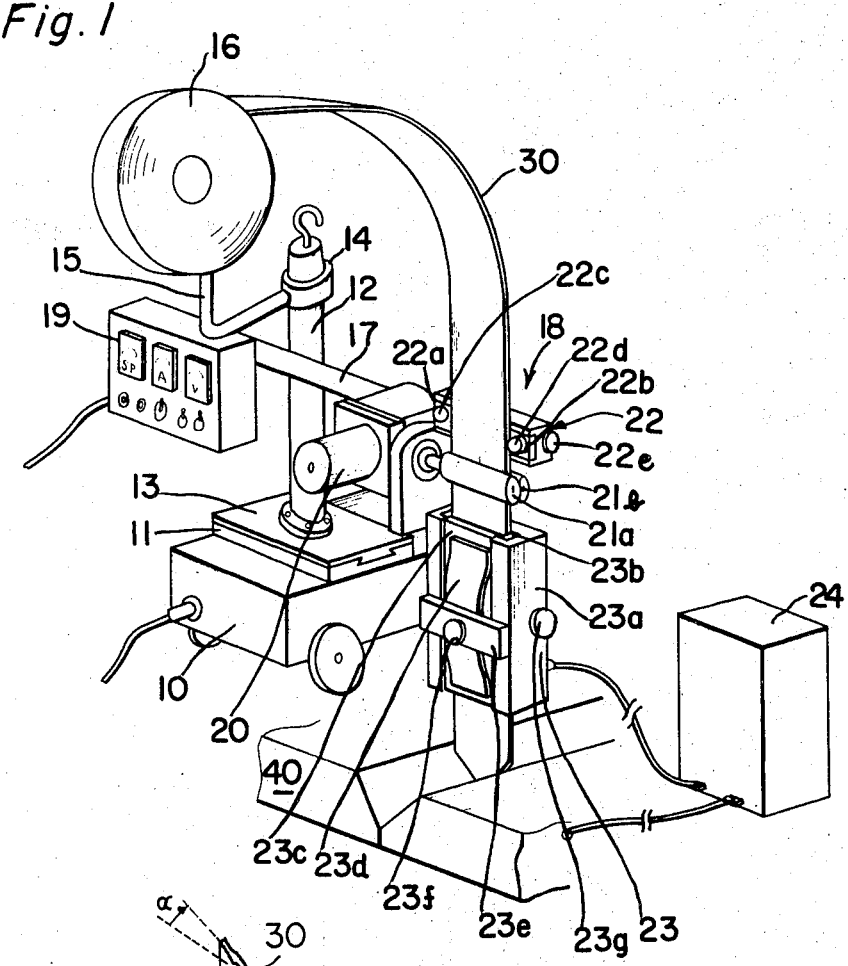

Before the description proceeds, it is to be noted that like parts are designated by like reference numerals throughout the several views of the accompanying drawings. In addition, for the sake of brevity, the electrode of substantially rectangular cross section herein employed and designed such that the width thereof is more than 5 times the thickness thereof is hereinafter referred to as an "electrode band" and it may be said that the method of the present invention can be referred to as "transverse electrode arc welding" in view of the fact that an arc welding method has the electrode band disposed such that the widthwise direction thereof is substantially at right angles to the weld line. Additionally, different thicknesses of the workpieces are shown in several views in dashed line and twisting angles of the electrode band being identified although not specifically described.

Reference is first made to an electrical arc welding apparatus capable of performing the method of the present invention, such as shown in FIG. 1.

The welding apparatus schematically shown in FIG. 1, for the purpose of illustration, includes a four-wheeled carriage 10 mounted on its upper surface with a guide table 11. A stud 12 has one end rotatably connected with a slider plate 13 so that stud 12 is movable in a direction perpendicular to the direction of travel of the carriage 10, the other end of stud 12 being mounted with a cylindrical bearing 14 rotatable about the axis of the stud 12. Extending from this bearing 14 is a supporter arm 15 for rotatably supporting an electrode supply reel 16.

The stud 12 is, at its intermediate portion, rigidly connected with a beam 17 having one end rigidly connected with an electrode feeding mechanism, generally indicated by 18, and the other end rigidly connected with a control box 19 wherein various control circuit elements and instrument gauges are accommodated.

The electrode feeding mechanism 18 includes a drive motor 20, a pair of pinch rollers 21a and 21b each having an axial length somewhat greater than the width of an electrode band 30 and one of which is adapted to be driven by drive motor 20. This electrode feeding mechanism 18 further includes an electrode positioner 22 and an electrode guide 23 disposed respectively above and below the pinch rollers 21a and 21b, the both of which are supported by a suitable framework which may be used to connect the drive motor 20 to one end of the beam 17.

The electrode positioner 22 ensures the prevention of displacement of the electrode band 30 in a direction lateral to the longitudinal axis of said electrode 30 and is formed with a pair of adjustable slider members 22a and 22b each having a projection 22c or 22d and movable in a direction perpendicular to the longitudinal axis of the electrode band 30, the movement of each of the slider members 22a and 22b being adjusted by means of manually rotatable knobs, only one of the knobs being shown as indicated by 22e which is operatively associated with the slider member 22b. It is to be noted that adjustment of the distance between the two projections 22c and 22d depends upon the width of the electrode band 30 used during a given welding process.

The electrode guide 23 acts concurrently as a straightener for straightening the electrode band 30 as the latter is passed therethrough and as a guide for guiding the tip of the electrode band 30 toward the weld line causing the widthwise direction of the electrode band 30 to be substantially at right angles to the weld line. To this end, this electrode guide 23 is constructed with a rectangular body 23a of substantially a cornered-C cross section having a guide groove 23b extending over the substantial length of rectangular body 23a, and a presser plate 23c loosely accommodated in guide groove 23b, but normally urged by a leaf spring 23d so as to press the electrode band 30 toward the depth of the guide groove, the leaf spring 23d being supported by a bridge member 23e secured to the rectangular body 23a across the groove 23b by means of an adjustable screw member 23f which is used to adjust the resiliency of the leaf spring 23d and thus the pressing force to be imparted to the electrode band 30. The rectangular body 23a of the electrode guide 23 may be provided on its lateral sides with a pair of adjustment members of, for example, screw type, only one of which is shown as indicated by 23g, for placing the electrode band 30 in position within the guide groove 23b while the electrode band 30 is guided therethrough.

The electrical circuit arrangement used in the welding apparatus of FIG. 1 for establishing an arc between the electrode tip and workpieces 40 to be welded may be of any known type and therefore the details thereof are herein omitted. The electrical circuit arrangement is in general accommodated within the control box 19, but a welding power supply is separately shown as indicated by 24, welding power supply 24 being utilized to supply welding voltage between the electrode band 30 and the workpieces 40 to be welded while supplying a welding current density of not less than 50 A/mm$^2$ across the gap between the electrode tip and the workpieces.

It is to be noted that the welding apparatus shown in FIG. 1 is particularly designed for a flat position arc welding process. However, for arc welding in various positions, numerous modifications are apparent to those skilled in the art in view of the fact that the welding apparatus of the present invention may be of the same construction as the conventional one except for the electrode feeding mechanism being designed such as hereinbefore described.

Hereinafter, the method of electrical arc welding according to the present invention will be described.

Referring now to FIG. 2, a pair of workpieces 40a and 40b are each shown as having one edge being cut off and being abutted against each other, so as to represent a single-V groove 41 as illustrated by the chain line. An arc weld is applied to the single-V groove joint 41 while the electrode band 30 is continuously supplied by means of the pinch rollers 21a and 21b, the rotation of one of which is controlled by an electrical signal fed from the control box 19 to the drive motor of the electrode feeding mechanism 18 and, at this time, an arc is established between the electrode tip 30a and the workpieces 40a and 40b in any known manner.

In this case, the electrode band 30 has preferably a width one-half to three-halves as large as the groove width of the single-V groove joint 41. Of course, the electrode is supplied such that the widthwise direction of said electrode band is oriented at right angles to the weld line along which a resultant bead is to be formed. If the ratio of the width of the electrode band 30 relative to the groove width of the groove joint 41 is not within the range of 0.5 to 1.5, good penetration will not be obtained and, therefore, no sufficiently welded configuration of a resultant bead can be observed, as will be discussed below.

It is to be noted that, as the arc welding process proceeds, it has been observed that the electrode tip 30a of the electrode band 30, which was originally square-edged, is shaped to fit with the shape of the single-V groove joint of the workpieces 40a and 40b to be welded. In other words, after the electrode tip 30a has been shaped as hereinbefore described, an arc of uniform length can be advantageously maintained between a pair of flanks of the shaped electrode tip 30a and the groove faces of the joint 41 throughout the remaining period of welding. In this respect, the method of the present invention is broadly different from that of the conventional type, wherein an arc generated between the tip of the circular electrode and the workpieces to be welded is merely oriented toward a molten pool formed thereby.

In view of the fact that an arc of uniform length can be generated between the flanks of the electrode tip 30a and the groove faces of the joint 41, i.e., cut-out faces 40c and 40d of the respective workpieces 40a and 40b to be welded, as hereinbefore described, the groove faces of the joint 41 can be made uniformly molten by the effect of heat generated by the arc, so that uniform penetration can be obtained with substantial elimination of such weld defects as hereinbefore described in connection with the conventional arc welding method of similar character. In addition, the method of the present invention can be advantageously applied subject to a groove joint of small groove angle without any accompanying weld defects which have heretofore occurred during the conventional method of similar character. Accordingly, the total amount of weld deposits and, hence, the total amount of electrode band consumed can be reduced as compared with that in the conventional method and, therefore, the method of the present invention can be economically practiced.

Furthermore, it is well known that, in the conventional method of similar character, variations in the welding current adversely affect the penetration of molten metal into the workpieces. However, according to the method of the present invention, although variations in the welding current somewhat affect the degree of penetration, no substantial variation of the depth of penetration takes place since an arc of uniform length is generated between the flanks of the electrode tip and the groove faces of the joint.

Moreover, in the conventional method of similar character, variations in the arc voltage adversely affect the penetration of molten metal as well as the configuration of a resultant bead and, therefore, the arc voltage must be maintained at a constant value during the whole period of welding. However, in the method of the present invention, such variations in the arc voltage merely lead to variations in the arc length in a small degree and, hence, the location of the highest temperature zone of the arc somewhat varies in the direction of the arc length, and this does not adversely affect the penetration and the configuration of the resultant bead so much, as has been experienced in the conventional method of similar character.

As hereinbefore described, the method of the present invention is such that, in view of the fact that variations of the welding current and/or the arc voltage during the period of welding will not affect the welding result as adversely as have been often experienced in the conventional method of similar character, welding can be performed under a relatively wide permissible range of welding condition.

Even the positioning of the electrode band, particularly, the electrode tip 30a, need not be strictly controlled during welding. This will be described with reference to FIG. 3 in which the condition is shown wherein the electrode band 30 is slightly displaced in a direction lateral with respect to the longitudinal axis of said electrode band 30. As is clearly illustrated, even if the electrode band 30 is laterally displaced during the welding operation, melting of the electrode tip proceeds in such a way that the distance between each of the flanks of the electrode tip 30a and the corresponding groove face of the joint 41 is maintained at a constant value and, therefore, unless the electrode band 30 is otherwise excessively displaced in a direction lateral to the longitudinal axis of the electrode band, the welding result does not vary. Similar considerations may apply in the case where the electrode band is slightly inclined forwardly or backwardly of the welding direction. However, in the event that the electrode band is excessively displaced or inclined as hereinbefore described either of the cut-out faces 40c and 40d of the respective workpieces 40a and 40b, in the direction to which said electrode band is displaced and/or upper portions of said cut-out faces, will be unnecessarily melted, resulting in an insufficient penetration of molten metal.

In view of the foregoing, since an arc of uniform length can be generated between the flanks of the electrode tip 30a and the groove faces of the joint 41 without local concentration of heat of the arc, slightly inaccurate edge penetration will not constitute a cause for incomplete penetration of the molten metal, melt-down of molten metal and/or other weld defects.

However, care must be taken in that the electrode, which may preferably have a band-like shape, must have a width more than 5 times the thickness thereof and must receive a welding current of a current density of not less than 50 A/mm$^2$.

Assuming that the electrode cross section and, hence, the current density remain the same and the width of the electrode band is decreased to a value substantially equal to the thickness thereof, there may be a tendency that the orientation of the arc will increase and the depth of penetration will become large with a resultant bead having a narrow bead width and, in an extreme case, the welding result will be such as afforded by the use of the electrode of circular cross section. On the other hand, if the width of the electrode band 30 is less than 5 times the thickness thereof, the various advantages of the present invention over the conventional method of similar character will no longer be observed.

Although the width of the electrode band 30 is recommended to be more than 5 times the thickness thereof, an electrode band having a width 20 to 25 times the thickness has been found to ensure a favorable weld. The reason for this is not clear at this time, but a series of experiments conducted have demonstrated this.

With attention now directed to the welding current characteristic, it is well known that, if the current density has a small value per square millimeter, stabilization of the arc will no longer be ensured, resulting in a lack of good penetration and/or an increased amount of electrode consumed. Similar considerations may apply even in the method of the present invention if the current density of the welding current supplied to the electrode band is smaller than 50 A/mm$^2$. More specifically, if the current density in the method of the present invention is smaller than 50 A/mm$^2$, even though the electrode tip melts under an unstable arc, while being shaped in conformity with the shape of the groove, the melting speed will be low, with the depth of penetration being substantially the same as afforded in a conventional surface build-up are welding process and, therefore, the method of the present invention will be no longer useful.

In the foregoing, it has been stated that the width of the electrode band employed in the method of the present invention, particularly where the latter is to be executed for a groove joint, must be one-half to three-halves times the groove width of the groove joint. In fact, a series of experiments have shown that, only if the width of the electrode band meets this requirement as hereinbefore described, can a favorable welding result be obtained. However, in the event that the electrode band width is more than three-halves times the groove width, it has been observed that, although a resultant bead 42 is favorable in that the bead width is large while the reinforcement of the weld is small, the upper portion of the groove faces are unnecessarily melted such as shown in FIG. 4, resulting in an increased welding cost. On the other hand, in the event that the electrode band width is less than one-half times the groove width, the upper portions of the groove faces are left unmelted so that the groove joint cannot be satisfactorily filled with weld deposits by one-pass welding, such as shown in FIG. 5.

Although in the foregoing embodiment the method of the present invention has been described as executed for the single-V groove joint, the method of the present invention may be applied when using a backing plate as shown in FIG. 6 and also may be executed subject to a double-V groove joint such as shown in FIG. 7. In addition, it is to be noted that, other than the single-V groove joint and the double-V groove joint, a single-U groove joint and a double-U groove joint can be respectively welded according to the method of the present invention without any reduction of the welding result.

FIG. 8 shows another example of the method of the present invention which is applied in fillet welding in flat welding position. Even in this case, the electrode band 30 is in the transverse arrangement, the term "transverse arrangement" herein and hereinafter used being defined as the widthwise direction of the electrode band oriented substantially at right angles to the weld line.

In fillet welding, the method of the present invention can be advantageously performed in a similar manner as hereinbefore described with no substantial reduction of the welding result. However, it is to be noted that the width of the electrode band used in fillet welding is preferably not less than half the distance between a pair of the opposed toes of a resultant bead of desired leg lengths, but not more than the same value as this distance. It is also to be noted that, in fillet welding, the displacement of the electrode band greatly affects formation of a pair of legs of the resultant bead and, therefore, unless otherwise strictly dimensioned leg lengths are desired, the electrode band must be exactly maintained in place between the workpieces abutted with each other in the form of T-joint.

Although description has been made wherein the method of the present invention is performed in a flat welding position, similar consideration may apply where the method of the present invention is performed in any one of the welding positions other than the flat position. It is because of the finding that the pattern of generation of arc between the electrode tip of the electrode band and the joint of the workpieces to be welded is not affected by the welding position, an arc of uniform length being therefore maintained between the flanks of the electrode tip and the joint of the workpieces.

In view of this fact, the method of the present invention may be equally performed in a horizontal welding position subject to the workpieces having a joint such as shown in FIG. 9 or the workpieces having opposed groove joint such as shown in FIG. 10 without requiring strict control and maintenance of the positioning of the electrode band and the welding conditions and with substantial elimination of shrinkage, cracking, and undercuts oftentimes occurring in the upper workpiece. Moreover, the method of the present invention may also be performed in a flat welding position in the non-positioned fillet welding process as shown in FIG. 11 subject to the reversed T joint. Of course, non-positioned fillet welding, by means of the method of the present invention, does not require strict control and maintenance as to the angle of orientation of the arc, the position of the electrode band relative to the vertical line perpendicular to the weld line as well as the welding conditions which are generally required in the same process according to the conventional arc welding method of similar character.

Furthermore, the method of the present invention can be applied in a fillet welding process having a vertical welding position, such as shown in FIG. 12, wherein a segment 50 is utilized for preventing a resultant bead, which is not completely solidified, from drooping.

According to the present invention, there is an additional advantage in that the method of the present invention can be performed in multi-pass welding for a groove joint or a fillet joint.

Thus, it is clear that the method of the present invention can be advantageously performed in various welding positions other than in an overhead welding position without requiring strict control and maintenance of joint design and welding conditions.

From the foregoing description, it is also clear that, as shown in FIG. 13, in the method of the present invention, arc welding of tandem sequence can be practiced by the use of a pair of electrode bands 30b and 30c spaced a suitable distance with respect to each other in the direction of welding. In this case, the electrode bands 30b and 30c are each in the transverse arrangement.

In the following description will be made in connection with the arc welding method of the present invention wherein at least one electrode band is twisted about the longitudinal axis thereof in either the clockwise or counterclockwise direction through a certain acute angle within the range of 45° to 90°, preferably 75° from the weld line which is equivalent to the acute angle within the range 0° to 45° from a line perpendicular to the weld line, preferably 15°. If the electrode band is twisted to an extent that the acute angle formed between the widthwise direction of the electrode band, which extends at right angles to the weld line, and the direction of welding or the weld line is within the range of more than 45° to less than 90°, preferably 75°, the acute angle being indicated by α if the electrode band is twisted in the clockwise direction, and by β if twisted in the counterclockwise direction, the configuration of a resultant bead is such that, as shown in FIG. 15, the bead contour, which has been often observed as formed in a direction parallel to the weld line at a trailing side of an electrode in the case where the latter is of circular cross section, is deviated in a direction lateral to the weld line at the trailing side of the electrode band with respect to the direction of welding.

This occurs because the arc force F' of arc generated between the flanks of the electrode tip of the electrode band 30 and the workpieces 40a and 40b does not act toward the joint, but in a direction substantially at right angles to one plane surface of the electrode band at the trailing side as the electrode is traversed in the direction of welding, so that the depth of penetration may be generally small with the bead configuration being such as hereinbefore described. For comparison it is stated that, in the method of similar character wherein the electrode of circular cross section is utilized, the arc force F has a tendency to act toward the joint in a radially outwardly acting fashion as clearly shown in FIG. 14, while in a direction opposite to the direction of welding, so that the depth of penetration may become large at the depth of the joint and small at the upper portion of the joint with the bead configuration being such as shown in FIG. 14 and hereinbefore described.

Accordingly, if the electrode band is twisted through a certain acute angle as hereinbefore described substantially the same advantages as afforded by the conventional method wherein the angle of orientation of the electrode and/or the position of the electrode are varied can be appreciated. Especially, in multi-pass welding, this method, wherein the electrode band is twisted, can ensure a simplified welding procedure with substantial improvement in the weldability.

Nevertheless, the method wherein the electrode band is twisted may be applied in single pass welding, an advantage of which will be greatly appreciated, especially where the workpieces have different thicknesses so that the resultant bead is deviated in such a way that most of the weld deposit is centered on the side of the workpiece of greater thickness. One example of this is illustrated in FIG. 16.

Referring now to FIG. 16, there are shown a pair of workpieces 40a' and 40b' of different thickness, the thickness of the workpiece 40a' being greater than that of the other 40b', both arranged so as to represent a substantially reversed-T joint while the electrode band is twisted through an angle α during welding, so that one of the opposed sides of said electrode band adjacent to the workpiece 40a' of greater thickness acts as a leading edge with respect to the direction of welding as indicated by the arrow X. During this process, it is clear that a resultant bead having a greater leg length at the side of the thicker workpiece 40a' and a smaller leg length at the side of the thinner workpiece 40b' can be obtained. It is to be noted that, according to the conventional method of similar character, to obtain the same result requires a strict control and maintenance of the angle of orientation of the arc and/or the position of the electrode with respect to the vertical line at right angles to the weld line.

Various applications of the method of the present invention wherein the electrode band is twisted as hereinbefore described will be hereinafter described in connection with multi-pass welding procedures with reference to FIGS. 17 through 25.

Figure 18:
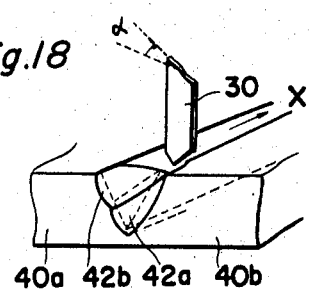

FIGS. 17 and 18 illustrate the condition in which the single-V groove joint 41 having a groove width as great as single pass welding does not give a sufficient result and is welded in two pass, wherein FIG. 17 shows the first pass while FIG. 18 shows the second or final pass.

During the first pass, the electrode band 30 is twisted through the acute angle α in the counterclockwise direction about the longitudinal axis of the electrode band so that one of the opposed sides of the electrode band which is adjacent to the workpiece 40a acts as a trailing edge, while the other adjacent to the workpiece 40b as a leading edge with respect to the direction of welding. Hence, after the first pass has completed, the resultant bead can be observed as formed in such a way that, as clearly shown in FIG. 17 one of the toes of the resultant bead 42a is situated on the upper extremity of the workpiece 40b, while the other toe is situated on an intermediate portion between the upper extremity of the workpiece 40a and the lower extremity of the workpiece 40a. In other words, the length of the leg of the resultant bead 42a associated with the workpiece 40b is greater than that associated with the workpiece 40a.

During the second or final pass, as shown in FIG. 18, the electrode band 30 is twisted in the clockwise direction through the acute angle α of the same value as the angle β so that, after this final pass has been completed, the resultant bead 42b is deviated toward the workpiece 40a in an opposed fashion to that represented by the first pass bead 42a. As a whole, it is apparent that a multi-layer weld having a sufficient penetration of weld deposit can be obtained as clearly shown in FIG. 18. Thus, what is necessary to apply the method of the present invention in multi pass welding is to twist the electrode band in either a clockwise or counterclockwise direction each time a single pass is to be completed, requiring no complicated procedure.

On the contrary thereto, according to the conventional method of similar character, while the welding conditions are each strictly maintained, the angle of orientation of the arc and the position of the electrode relative to the vertical line perpendicular to the weld line must be re-adjusted each time a single pass is completed.

Figure 19:
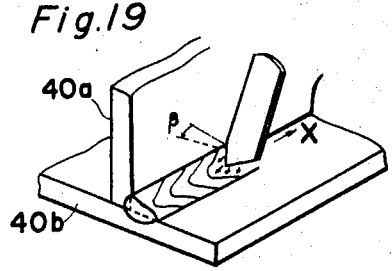
Figure 20:
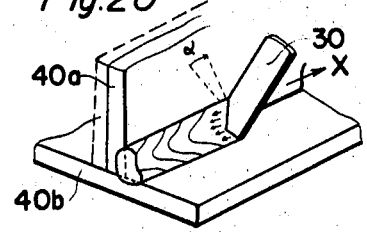

FIG. 19 and FIG. 20 illustrate conditions in which non-positioned fillet welding are respectively performed in accordance with the method of the present invention subject to a reversed-T joint of the workpieces 40a and 40b. Particularly, in FIG. 19, the electrode band 30 is twisted through an angle β so that one of the opposed sides of the electrode band 30 which is adjacent to the workpiece 40b acts as a leading edge with respect to the direction of welding, resulting in that a resultant bead is formed deviated toward the workpiece 40b.

On the contrary thereto, if the electrode band 30 is twisted through an angle α as shown in FIG. 20, so that the other side of the electrode band which is adjacent to the workpiece 40a acts as a leading edge with respect to the direction of welding, a resultant bead is formed deviated toward the workpiece 40a.

In view of the foregoing, if the procedures shown in FIGS. 19 and 20 are alternately effected during the first and second passes, respectively, it is clear that a fillet weld having a pair of legs of great leg lengths can be obtained without substantial accompanying weld defects as undercuts and overlaps. Of course, the penetration of molten metal is observed satisfactorily. On the contrary thereto, in the conventional method of similar character, wherein an electrode of circular cross section is utilized, while the welding conditions are each strictly maintained, the angle of orientation of the arc and the position of the electrode relative to the vertical line perpendicular to the weld line must be re-adjusted each time a single pass is completed in multi-pass welding.

Figure 21:
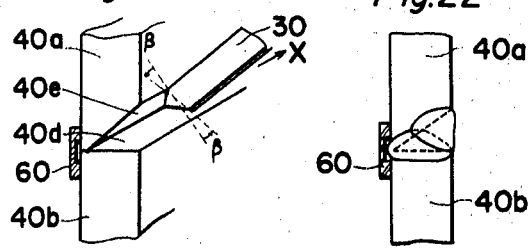
Figure 22:
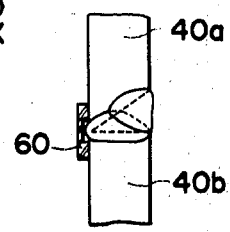

FIGS. 21 and 22 illustrate the condition where arc welding according to the method of the present invention is effected subject to a pair of the workpieces 40a and 40b, one of which has one edge inclined to give a groove face and both being arranged vertically to give a groove joint having a pair of groove faces 40e and 40d, the surfaces of said workpieces 40a and 40b which are adjacent to the groove root being backed up with a backing plate 60 in any known manner.

As clearly shown in FIG. 22, a first bead is formed by twisting the electrode band 30 through the angle $\beta$ during the first pass so that one of the opposed sides of the electrode band which is adjacent to the groove face 40d of the lower workpiece 40b acts as a leading edge with respect to the direction of welding. A second bead, which is formed after the first bead has been formed, is formed by twisting the electrode band 30 through the angle $\alpha$ during the second or final pass, so that the other side of the electrode band adjacent to the groove face 40e of the upper workpiece 40a acts as a leading edge with respect thereto, said second bead being used to fill a groove formed between the groove face 40e and the outer surface of the first bead thus formed during the previous pass.

Even in the method of FIGS. 20 and 21 in a similar manner as in non-positioned fillet welding according to the present invention as hereinbefore described, strict control and maintenance of the angle of orientation of the arc, the position of the electrode and the welding condition during each pass are not required so much as required in the conventional method for eliminating such weld defects as undercuts and overlaps.

Figure 23:
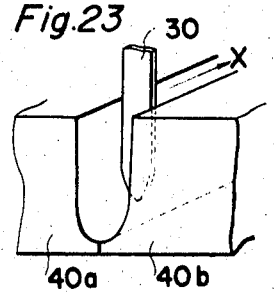
Figure 24:
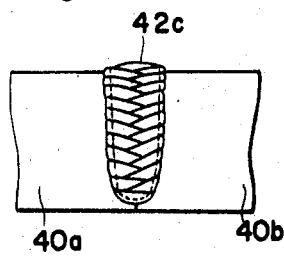

FIGS. 23 and 24 illustrate the condition where arc welding according to the method of the present invention is effected subject to a single-U groove joint formed between the workpieces 40a and 40b in a plurality of passes, for example, 23 passes, in flat welding position. In this case, upon completion of each pass during the whole period of welding, the electrode band 30 must be alternately twisted in the clockwise and counterclockwise directions substantially as hereinbefore described.

However, it is to be noted that, during the final pass, the electrode band 30 may be at right angles to the weld line depending upon the configuration of a multi-layer of bead that has been formed prior to the final pass. Alternatively, welding may proceed without twisting the electrode band in the alternate directions during some of the passes while the electrode band is twisted in the opposite direction during the remaining passes, depending upon the shape of the groove joint.

According to the conventional method of similar character for welding the single-U groove joint having a great groove depth, it has been often times experienced that the cracks easily occur, due to the shape of each bead formed during respective passes and/or other weld defects occur due to slag inclusion during welding. For this reason, the conventional method requires a precise manipulation of a welding instrument so that the angle of orientation of the arc, the position of the electrode and the welding conditions are strictly controlled and maintained during welding.

However, in the method of the present invention, in view of the fact that the arc is uniformly generated between the flanks of the electrode tip of the electrode band and the groove faces of the groove joint, substantial elimination of such beads susceptible to cracking and/or slag inclusion can be ensured without requiring such a precise manipulation of the welding instrument as has been required in the conventional method.

It is also to be noted that the method of the present invention may be performed by the use of the electrode band in combination with the electrode of circular cross section which is largely employed in the existing arc welding methods. This is illustrated in FIG. 25.

Figure 25:
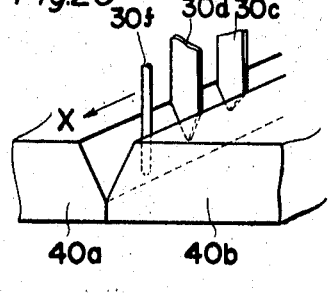

Referring now to FIG. 25, there is shown a method of the present invention wherein three electrodes are used, wherein one of said electrodes positioned at the leading side with respect to the welding direction X is a conventional electrode of circular cross section while the remaining electrodes are electrode bands. Attention is called to the fact that an intermediate electrode band 30d equally spaced from both electrode 30f and the electrode band 30c which is a trailing electrode is twisted a certain angle in either the clockwise or counterclockwise direction, while the trailing electrode band 30e is twisted the same angle in the opposite direction. With the arrangement of these electrodes 30d, 30c and 30f as hereinbefore described, the leading electrode 30f provides deep penetration at the root portion of the groove joint while the intermediate and trailing electrodes 30d and 30c are responsible for sufficient penetration at the groove faces of the groove and, as a result, a uniform bead of good penetration can be advantageously obtained.

It is to be noted that even the method of FIG. 25 does not require strict control and maintenance of the angle of arc orientation, electrode positioning and welding conditions as hereinbefore described and it can be performed in any other welding positions other than the flat welding position as shown, except for the overhead welding position. Furthermore, it can be applied in non-positioned fillet welding.

From the foregoing full description of the electrical arc welding method of the present invention, it has now become apparent that execution of the method of the present invention does not substantially require any complicated procedures of manipulation of the welding instrument as have been required in the conventional method of similar character substantially as hereinbefore described. However, for a better understanding of the present invention, the latter will now be illustrated by way of example as hereinafter set forth.

Example I

Figure 26:
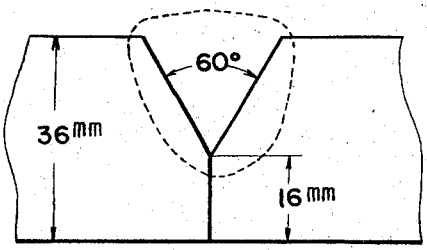
Figure 26:
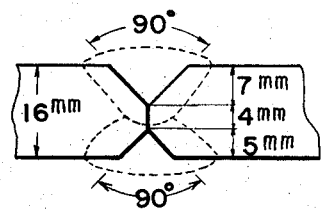
Figure 26:
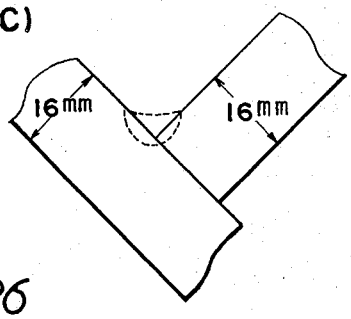
Figure 26:
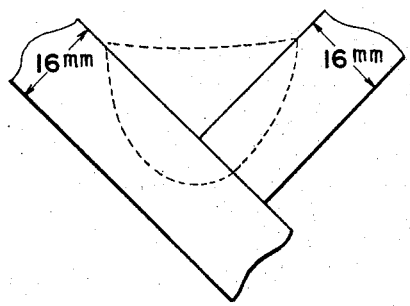
Figure 26:
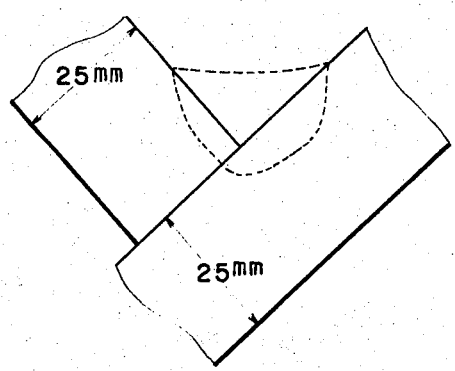
Figure 26:
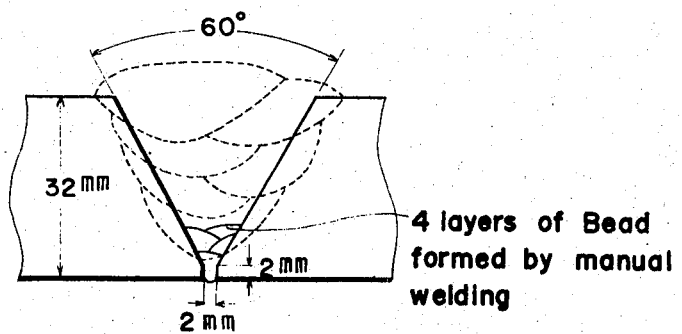
Figure 26:
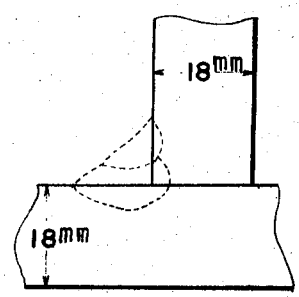
Figure 26:
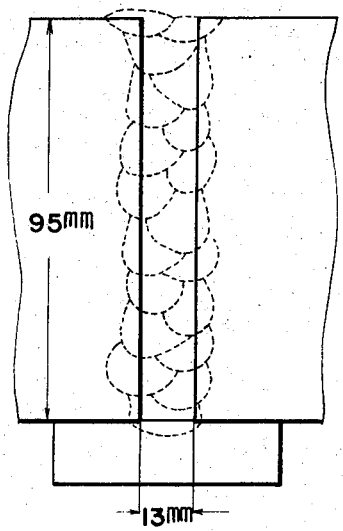
Figure 26:
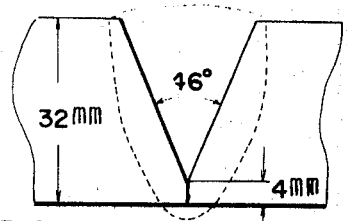
Figure 26:
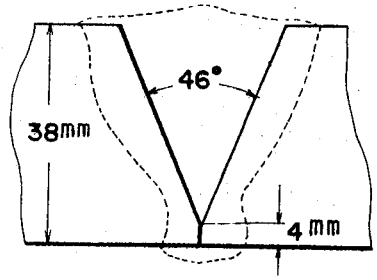
Figure 26:
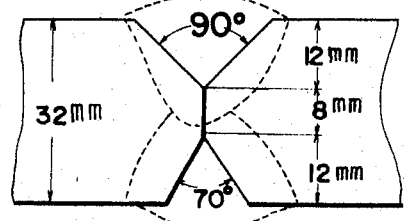

Arc welding was effected in accordance with the method of FIG. 2 under the following welding conditions subject to the joint of the shape and dimensions as shown in FIG. 26(A).

| Welding Conditions | |
|---|---|
| Welding Power Supply Characteristic | A.C. |
| Dimensions of Electrode Band | 1.6 × 20 mm. |
| Welding Current | 2,400A |
| Arc Voltage | 42 Volts |
| Welding Speed | 40 cm/minute |

Results:

In spite of the high welding current and the current density, a bead having a gently curved contour was obtained over the whole length of the joint with good penetration as indicated by the dotted line in FIG. 26(A). No cracking due to stress concentration or heat shrinkage occurred. In addition, no blowholes and slag inclusions were observed. The welded portion represents a dentlite structure.

Example II

Arc welding was effected in accordance with the method of FIG. 7 under the following welding conditions subject to the joint of the shape and dimensions as shown in FIG. 26(B).

| Welding Conditions | Face Pass | Back Pass |
| --- | --- | --- |
| Welding Power Supply Characteristic | A.C. | A.C. |
| Dimensions of Electrode Band | 1.2 × 1.5 | 1.2 × 1.5 mm. |
| Welding Current | 1,200 A | 1,040 A |
| Arc Voltage | 32 V. | 31 V. |
| Welding Speed | 50 cm/min. | 55 cm/min. |

Results:

Both beads formed on the face and back passes have a sufficient configuration with sufficient penetration. These beads were sufficiently connected at the root portion of the double-V joint shown in FIG. 26(B). No blowholes and crackings occurred.

Example III

Arc welding was effected in accordance with the method of FIG. 8 under the following welding condition subject to the joint of the shape and dimensions as shown in FIG. 26(C).

| Welding Conditions | |
| --- | --- |
| Welding Power Supply Characteristic | A.C. |
| Dimensions of Electrode Band | 1.2 × 8.0 mm. |
| Welding Current | 630 A |
| Arc Voltage | 30 V. |
| Welding Speed | 120 cm/min. |

Results:

In this welding, it was intended to obtain the maximum leg length of 6 mm in positioned fillet welding. The results are indicated by the dotted line in FIG. 26(C) and it is apparent that sufficient penetration could be obtained with a resultant bead being ideally concaved.

Example IV

Arc welding was effected in accordance with the method of FIG. 8 under the following welding conditions subject to the joint of the shape and dimensions as shown in FIG. 26(D).

| Welding Conditions | |
| --- | --- |
| Welding Power Supply Characteristic | A.C. |
| Dimensions of Electrode Band | 1.2 × 20 mm. |
| Welding Current | 1,620 A. |
| Arc Voltage | 44 V. |
| Welding Speed | 30 cm/min. |

Results:

Substantially the same as in Example III. But, it is to be noted that arc welding in this example was intended to obtain the maximum leg length of 24 mm in positioned fillet welding.

Example V

Arc welding was effected in accordance with the method of FIG. 9 under the following welding conditions subject to the joint of the shape and dimensions as shown in FIG. 26(E).

| Welding Conditions | |
| --- | --- |
| Welding Power Supply Characteristic | D.C., (R.P.) |
| Dimensions of Electrode Band | 0.8 × 10 mm |
| Welding Current | 750 A. |
| Arc Voltage | 31 V. |
| Welding Speed | 50 cm/min. |

Results:

In this example, it was intended to obtain the maximum leg length of 9 mm. in fillet welding in horizontal welding position.

In the resultant bead, no weld defects were observed in the interior of the bead, but with sufficient penetration to an extent that the welded joint has a sufficient mechanical strength. However, penetration at the root portion of the groove seemed to be somewhat insufficient while the resultant bead has a tendency to droop downwardly. The reason for this is because the welding current density was somewhat high and, accordingly, if this is correctly selected, a sufficient bead can be obtained. However, note that no undercut was observed at the upper workpiece adjacent to the toe of the resultant bead.

Example VI

Arc welding was effected in accordance with the method of FIG. 9 under the following welding conditions subject to the joint of the shape and dimensions as shown in FIG. 26(F).

| Welding Conditions | |
| --- | --- |
| Welding Power Supply Characteristic | D.C. (R.P.) |
| Dimensions of Electrode Band | 0.8 × 10 mm. |
| Welding Current | 800 A. |
| Arc Voltage | 32 V. |
| Welding Speed | 50 cm/min. |

Results:

In this example, it was intended to obtain the maximum leg length of 10 mm. in fillet welding in horizontal welding position.

The results are substantially the same as in Example V.

Example VII

Arc welding was effected in accordance with the method of FIG. 11 under the following welding conditions subject to the fillet joint of the shape and dimensions as shown in FIG. 26(G).

| Welding Conditions | |
| --- | --- |
| Welding Power Supply Characteristic | A.C. |
| Dimensions of Electrode Band | 1.2 × 8 mm |
| Welding Current | 710 A. |
| Arc Voltage | 32 V. |
| Welding Speed | 80 cm/min. |
| Leg Length Desired | 8 mm. |

Results:
A sufficiently welded bead having a gently curved contour with sufficient penetration could be obtained.

Example VIII

Arc welding was effected in accordance with the method of FIG. 11 under the following welding conditions subject to the fillet joint of the shape and dimensions as shown in FIG. 26(H).

| Welding Conditions | |
|---|---|
| Welding Power Supply Characteristic | D.C. (S.P.) |
| Dimensions of Electrode Band | 1.2 × 8 mm |
| Welding Current | 560 A. |
| Arc Voltage | 29 V. |
| Welding Speed | 80 cm/min. |
| Leg Length Desired | 8 mm. |

Results:
Substantially the same as in Example VII. However, in this example, the welding current density was low so that the penetration width seemed to be somewhat insufficient.

Example IX

Arc welding was effected in accordance with the method of FIG. 13 under the following welding conditions subject to the groove joint of the shape and dimensions as shown in FIG. 26(I).

| Welding Conditions | Leading Electrode | Trailing Electrode |
|---|---|---|
| Welding Power Supply Characteristic | [A.C.: Difference in phase angle between these electrodes is 90°] | |
| Dimensions of Electrode Bands | 1.6×20 mm. | 1.6×20 mm. |
| Welding Currents | 2,500 A. | 2,000 A. |
| Arc Voltages | 39 V. | 40 V. |
| Welding Speed | 28 cm/min. synchronized | |
| Space Between Electrode Bands | 200 mm. | |

Results:
As indicated by the dotted line in FIG. 26(I), the resultant bead was observed such that the bottom portion of the cross section of the bead is substantially uniformly spaced from the groove faces of the joint, with the configuration thereof being favorable. However, it is also observed that the width of penetration about the root of the joint is considerably reduced. This is because of the use of a backing plate by which the relevant portion is somewhat cooled.

The weld represents a micro-dentlite structure without any accompanying cracks and/or blowholes.

Figure 27:
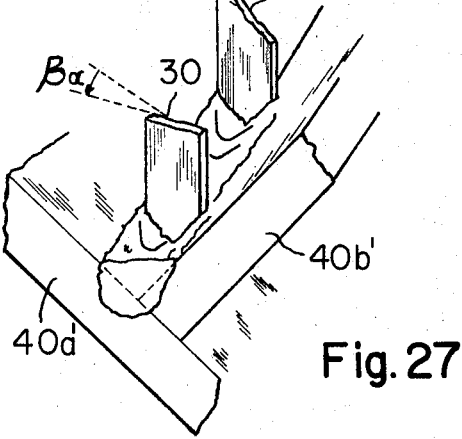

Example X:

Arc welding was effected in accordance with the method of FIG. 27 under the following welding conditions subject to the fillet joint of the shape and dimensions as shown in FIG. 26(J).

| Welding Conditions | Leading Electrode | Trailing Electrode |
|---|---|---|
| Welding Power Supply Characteristic | [A.C.: Difference in phase angle between these Electrodes is 120°] | |
| Dimensions of Electrode Bands | 1.6×20 mm | 1.6×20 mm. |
| Welding Currents | 2,000 A. | 1,800 A. |
| Arc Voltages | 38 V. | 37 V. |
| Welding Speed | 55 cm/min. synchronized | |
| Space between Electrode Bands | | 125 mm. |
| Angles of Twist | 15° | 15° |

Results:
Although the depth of penetration was somewhat small, a resultant bead has a satisfactory configuration for this type of welding. This can be evidenced by the representation made by the dotted line in FIG. 26(J).

However, if the welding current density is somewhat increased, it is apparent that the bead of sufficient penetration can be obtained.

Example XI

Arc welding was effected in accordance with the method of FIGS. 17 and 18 under the following welding conditions subject to the groove joint of the shape and dimensions as shown in FIG. 26(K). It is to be noted that, prior to this arc welding, for filling the depth of the groove, manual arc welding was effected in four passes as indicated by the real line.

| Welding Conditions | First to Second Passes | Third to Sixth Passes |
|---|---|---|
| Welding Power Supply Characteristics | A.C. | A.C. |
| Dimensions of Electrode Band | 1.2 × 20 mm. | same |
| Welding Currents | 1,200A. | 1,300A. |
| Arc Voltages | 35 V. | 36 V. |
| Welding Speed | 40 cm/min. | 40 cm/min. |
| Angle of Twist | 45° | 45° |

Results:
In spite of irregular penetration in the groove face of the right-hand workpiece, that in the groove face of the left-hand workpiece was found satisfactorily for this type of arc welding. Of course, the resultant bead has no slag inclusion.

Example XII

Arc welding was effected in accordance with the method of FIGS. 19 and 20 under the following welding conditions subject to the fillet joint of the shape and dimensions as shown in FIG. 26(L).

| Welding Conditions | First Pass | Second Pass |
| --- | --- | --- |
| Welding Power Supply Characteristics | D.C. (R.P.) | A.C. |
| Dimensions of Electrodes | 1.2×11 mm. | 1.2×8 mm. |
| Welding Currents | 1,000 A. | 600 V. |
| Arc Voltages | 33 V. | 31 V. |
| Welding Speeds | 80 cm/min. | 100 cm/min. |
| Angles of Twist | 15° | 15° |
| Maximum Leg Length Desired | | 12mm. |

Results:

In spite of irregular penetration of molten metal in the upper workpiece, it is assumed that no cracking occurs due to this irregular penetration. In fact, overall examination of the resultant bead showed a sufficient weld for non-positioned fillet welding. In any event, the reason for the irregular penetration is the fact that the electrode band was somewhat displaced during the first pass and, accordingly, this can be easily compensated for.

Example XIII

Arc welding was effected in accordance with the method of FIGS. 23 and 24 under the following welding conditions subject to the groove joint of the shape and dimensions as shown in FIG. 26(M) in multi-pass welding.

| Welding Conditions | First to Fourth Passes | Fifth to Nineteenth Passes |
| --- | --- | --- |
| Welding Power Supply Characteristics | A.C. | A.C. |
| Dimensions of Electrode Band | 1.2 × 8 mm | 1.2 × 8 mm |
| Welding Currents | 700 A. | 700 A. |
| Arc Voltage | 40 V. | 40 V. |
| Welding Speed | 35 cm/min. | 40 cm/min. |
| Angles of Twist | 45° except for the first pass in which it was 0° | 45° |

Results:

In view of the fact that welding was performed subject to the groove of small groove width while the electrode was inserted in the groove, the angle of twist did not remain the same during the whole period of welding and, for this reason, penetration in the both groove faces was irregular. However, no cracking and blowholes as well as slag inclusions were observed with a sufficient mechanical strength being imparted to the welded portion. In any event, if the angle of twist is exactly determined with respect to each pass, a sufficient weld would be observable without substantial irregular penetration.

Example XIV:

Arc welding was effected in accordance with the method of FIG. 25 under the following welding conditions subject to the groove joint of the shape and dimensions as shown in FIG. 26(N).

| Welding Conditions | Leading Electrode | Trailing Electrode |
| --- | --- | --- |
| Welding Power Supply Characteristics | D.C. (R.P.) | A.C. |
| Dimensions of Electrode Band | — | 1.2×15 mm. |
| Diameter of Electrode | 3.2 mm | — |
| Welding Currents | 670 A. | 1,950 A. |
| Arc Voltage | 30 V. | 45 V. |
| Space Between Electrodes | 130 mm. | |
| Welding Speed | 40 cm/min. synchronized | |
| Angle of Twist | — | 0° |

During welding, the current density of the electrode band was sufficiently higher than that of the electrode of circular cross section.

Results:

As indicated by the dotted line in FIG. 26(N), a sufficient weld with beautiful bead configuration and satisfactory penetration width could be obtained which is ideal for this type of welding. Of course, no weld defect was observed in the interior of the resultant bead.

Example XV

Arc welding was effected in accordance with the method of FIG. 25 under the following welding conditions subject to the groove joint of the shape and dimensions as shown in FIG. 26(O).

| Welding Conditions | First Electrode | Second Electrode | Third Electrode |
| --- | --- | --- | --- |
| Welding Power Supply Characteristics | D.C. (R.P.) | A.C. | A.C. |
| Dimensions of Electrode Bands | 1.2×8 mm | 1.2×20 mm. | 1.2×15 mm. |
| Welding Currents | 1,100 A | 2,000 A. | 1,850 A. |
| Arc Voltages | 30 V. | 39 V. | 40 V. |
| Space Between Electrode Bands | | 190 mm. | 125 mm. |
| Angles of Twist | 0° | 15° | 15° |
| Welding Speed | 50.5 cm/min. synchronized | | |

Results:

Although irregular penetration took place because of an excessively high current density of the first electrode band, no weld defect was observed in the interior of the resultant weld with sufficient penetration depth over the entire groove faces. Of course, no objection will arise in practical use of this resultant weld.

Example XVI

In accordance with the teachings of the present invention, arc welding was effected by the use of two electrode bands subject to the opposed groove joints of the shape and dimensions as shown in FIG. 26(P).

| Welding Conditions During Face Pass | Leading Electrode | Trailing Electrode |
|---|---|---|
| Welding Power Supply Characteristics | A.C. | A.C. |
| Dimensions of Electrode Bands | 1.2 × 15 mm. | 1.6 × 20 mm |
| Welding Currents | 1,800 A. | 1,600 A. |
| Arc Voltages | 37 V. | 40 V. |
| Angles of Twist | 15° | 15° |
| Space Between Electrode Bands | 125 mm | |
| Welding Speed | 100 cm/min. synchronized | |
| During Back Pass | Leading Electrode | Trailing Electrode |
| Welding Power Supply Characteristics | A.C. | A.C. |
| Dimensions of Electrode Bands | 1.2 × 15 mm. | 1.6 × 20 mm. |
| Welding Currents | 1,680 A. | 1,600 A. |
| Arc Voltages | 39 V. | 40 V. |
| Angles of Twist | 15° | 15° |
| Space Between Electrode Bands | 125 mm. | |
| Welding Speed | 100 cm/min. synchronized. | |

Results:

In spite of the use of a plurality of electrode bands, both beads formed on the face and back passes have a sufficient configuration with sufficient penetration. These beads were sufficiently connected at the root portion of the joint shown in FIG. 26(P). No blowholes and cracks were observed.

Although the present invention has been fully disclosed in connection with the various embodiments described with reference to the accompanying drawings, it is to be noted that various changes and modifications are apparent to those skilled in the art from the foregoing disclosure. For example, the present invention can be applicable in any welding processes heretofore largely executed so far as the latter pertains to arc welding.

Furthermore, it is to be noted that a concept of arc welding herein used should be construed as including a submerged arc welding. Therefore, unless otherwise these changes and modifications depart from the true spirit and scope of the present invention, they should be construed as included therein.

What is claimed is:

1. A method of electrical arc welding comprising the steps of feeding at least one electrode from an electrode supply reel onto a pair of workpieces to be welded which are arranged to form a suitable joint extending in the direction of a weld line along which a desired bead is to be formed, said electrode being of rectangular cross section and having a width at least five times greater than the thickness thereof, and having a ratio of width thereof to joint groove width in the range of 0.5 to 1.5, said electrode being fed thereonto by means of an electrode drawing mechanism in such a way as to render the widthwise direction of said electrode to be twisted at a predetermined acute angle within the range of 45° to less than 90° from said weld line;

applying welding power from a suitable welding power supply to said electrode and said workpieces to establish an arc between said electrode and said workpieces and having a current density of at least 50A/mm² by which said electrode is consumed to form a weld deposit in said joint; and transporting said electrode in the direction of said weld line while being fed onto said workpieces during welding to cause the leading edge of said twisted electrode in the direction of transportation to deposit a greater amount of weld material on the workpiece adjacent thereto than on the workpiece adjacent the trailing edge.

2. A method as claimed in claim 1 wherein said joint is a single groove joint, with said workpieces being arranged in substantially a planar position.

3. A method as claimed in claim 1 wherein said joint is a double grooved joint having a pair of grooves to be welded, with said workpieces being arranged in a substantially planar position with said steps of feeding, applying and transporting being carried out for each groove of said double grooved joint.

4. A method as claimed in claim 1 wherein said joint is a T-joint, said feeding step forming a fillet between said workpieces at said T-joint.

5. A method as claimed in claim 1 wherein said workpieces are vertically arranged and wherein said joint is prepared such that the upper one of said workpieces has one edge, which is to be connected with the other lower workpiece, cut out, said electrode being fed in a substantially horizontal position.

6. A method as claimed in claim 1 wherein said workpieces are vertically arranged and wherein said joint is prepared such that the upper one of said workpieces has opposed edges cut out for forming a pair of grooves between said two workpieces, said electrode being fed in a substantially horizontal position.

7. A method as claimed in claim 1 wherein said joint is a reversed-T joint, said electrode being fed in an inclined position to form a fillet weld between said workpieces.

8. A method as claimed in claim 1 wherein said workpieces are vertically arranged to form a vertical T-joint, said electrode being fed in a substantially horizontal position and further including the step of providing a segment beneath said electrode for preventing the resultant weld bead from drooping.

9. A method as claimed in claim 1 wherein said electrode has an electrode tip shaped to fit with the shape of a joint to which welding is directed, whereby during welding said welding arc is established between a pair of flanks of said electrode tip and faces of said joint formed between a pair of the workpieces.

10. A method as claimed in claim 2 wherein said electrode has an electrode tip shaped to fit with the shape of a joint to which welding is directed, whereby during welding said welding arc is established between a pair of flanks of said electrode tip and faces of said joint formed between a pair of the workpieces.

11. A method as claimed in claim 3 wherein said electrode has an electrode tip shaped to fit with the shape of a joint to which welding is directed, whereby during welding said welding arc is established between a pair of flanks of said electrode tip and faces of said joint formed between a pair of the workpieces.

12. A method as claimed in claim 4 wherein said electrode has an electrode tip shaped to fit with the shape of a joint to which welding is directed, whereby during welding said welding arc is established between a pair of flanks of said electrode tip and faces of said joint formed between a pair of the workpieces.

13. A method as claimed in claim 1, wherein the step of feeding includes the step of substantially centering the twisted electrode with respect to the weld line.

14. A method as claimed in claim 1, wherein said joint is a single groove joint formed by a pair of workpieces of different thickness with said workpieces being arranged in substantially a planer position and positioning the leading edge of said electrode adjacent the workpiece of greater thickness.

15. A method as claimed in claim 1, wherein said joint is a double grooved joint having a pair of grooves to be welded and formed by said pair of workpieces of different thickness, said workpieces being arranged in a substantially planer position with said steps of feeding, applying and transporting being carried out for each groove of said of double groove joint with the leading edge of the electrode being positioned adjacent said workpiece of greater thickness.

16. A method as claimed in claim 1, wherein said joint is a T-joint formed by said pair of workpieces of different thickness, said feeding step forming a fillet between said workpieces at said T-joint with the leading edge of said electrode being positioned adjacent said workpiece of greater thickness.

17. A method as claimed in claim 1, wherein said workpieces are vertically arranged and wherein said joint is prepared such that the upper one of said workpieces has one edge, which is to be connected with the other lower workpiece, cut out, said electrode being fed in a substantially horizontal position with the leading edge of said electrode being positioned adjacent said lower workpiece.

18. A method as claimed in claim 1, wherein said workpieces are vertically arranged and wherein said joint is prepared such that the upper one of said workpieces has opposed edges cut out for forming a pair of grooves between said two workpieces, said electrode being fed in a substantially horizontal position for each groove and having the leading edge thereof being positioned adjacent the lower workpiece.

19. A method as claimed in claim 1, wherein said joint is a reversed-T-joint formed by workpieces of different thickness, said electrode being fed in an inclined position to form a fillet weld between said workpieces with the leading edge thereof being positioned adjacent the workpiece of greater thickness.

20. A method as claimed in claim 1, wherein said workpieces are of different thickness and are vertically arranged to form a vertical T-joint, said electrode being fed in a substantially horizontal position with the leading edge thereof being positioned adjacent the workpiece of greater thickness, and further including the step of providing a segment beneath said electrode for preventing the resultant weld bead from drooping.

21. A method as claimed in claim 1, wherein the steps of feeding, applying and transporting are repeated to effect the formation of a multi-pass weld, further including the step of alternately twisting said electrode in opposite directions during each successive pass in the formation of the multi-pass weld.

22. A method as claimed in claim 1, wherein said at least one electrode comprises at least two electrodes with one electrode being twisted in a first direction and another electrode being twisted in a direction opposite to the first direction.

23. A method as claimed in claim 1, wherein the angle of twist is approximately 75°.

* * * * *